(12) United States Patent  
Zhang et al.

(10) Patent No.: US 12,104,111 B2  
(45) Date of Patent: Oct. 1, 2024

(54) UNIQUE PDC MICROSTRUCTURE AND THE METHOD OF MAKING IT

(71) Applicants: CNPC USA Corporation, Houson, TX (US); Beijing Huamei, Inc., Beijing (CN); China National Petroleum Corporation, Beijing (CN)

(72) Inventors: Kai Zhang, Houston, TX (US); Chris Cheng, Houston, TX (US); Xiao Feng, Beijing (CN); Qi Peng, Beijing (CN); Xiongwen Yang, Beijing (CN)

(73) Assignees: CNPC USA CORPORATION, Houston, TX (US); BEIJING HUAMEI, INC, Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 319 days.

(21) Appl. No.: 17/654,721

(22) Filed: Mar. 14, 2022

(65) Prior Publication Data

US 2023/0287251 A1 Sep. 14, 2023

(51) Int. Cl.
*C09K 3/14* (2006.01)
*B24D 11/00* (2006.01)

(52) U.S. Cl.
CPC .......... *C09K 3/1436* (2013.01); *B24D 11/003* (2013.01)

(58) Field of Classification Search
CPC ..... C09K 3/1436; B24D 11/003; E21B 10/00; E21B 10/46
See application file for complete search history.

(56) References Cited

U.S. PATENT DOCUMENTS

| | | | |
|---|---|---|---|
| 8,157,029 B2 | 4/2012 | Zhang et al. | |
| 8,261,858 B1 | 9/2012 | Atkins et al. | |
| 8,863,864 B1 | 10/2014 | Miess | |
| 9,321,150 B2* | 4/2016 | Sheridan | C09K 3/1436 |
| 9,701,877 B2* | 7/2017 | Chakraborty | B01J 3/062 |
| 10,450,808 B1 | 10/2019 | Miess et al. | |
| 10,753,158 B2 | 8/2020 | Konovalov et al. | |

FOREIGN PATENT DOCUMENTS

WO 2016049449 A1 3/2016

OTHER PUBLICATIONS

International Search Report for PCT/US22/77177, Mailed on Feb. 16, 2023.

* cited by examiner

*Primary Examiner* — Pegah Parvini
(74) *Attorney, Agent, or Firm* — Frank Gao, Esq.

(57) ABSTRACT

A superabrasive compact and a method of making the superabrasive compact are disclosed. A superabrasive compact may comprise a diamond table and a substrate. The diamond table may be attached to the substrate. The diamond table may include bonded diamond grains defining interstitial channels. The interstitial channels may be filled with non-catalytic binder materials in some regions. The interstitial channels in some other regions may be filled with a catalytic materials from the substrate.

14 Claims, 6 Drawing Sheets

UNIQUE PDC MICROSTRUCTURE AND THE METHOD OF MAKING IT

TECHNICAL FIELD AND INDUSTRIAL APPLICABILITY

The present invention relates generally to superabrasive materials and a method of making superabrasive materials, and more particularly, to polycrystalline diamond compacts (PCD) made using agglomerated diamond granules as fillers at interstitial areas.

BACKGROUND OF THE INVENTION

Ultrahard diamond composite materials, typically in the form of abrasive compacts, are used extensively in cutting, milling, grinding, drilling and other abrasive operations, and also may be used as bearing surfaces and the like.

They generally contain a diamond phase, typically diamond particles, dispersed in a second phase matrix or binder phase. The matrix may be metallic or ceramic or a cermet. These particles may be bonded to each other during the high pressure and high temperature compact manufacturing process generally used, forming polycrystalline diamond (PCD).

Polycrystalline diamond (PCD) is used extensively due its high abrasion resistance and strength. In particular, it may find use within shear cutting elements included in drilling bits used for subterranean drilling.

A commonly used tool containing a PCD composite abrasive compact is one that comprises a layer of PCD bonded to a substrate. The diamond particle content of these layers is typically high and there is generally an extensive amount of direct diamond-to-diamond bonding or contact. Diamond compacts are generally sintered under elevated temperature and pressure conditions at which the diamond particles are crystallographically or thermodynamically stable.

The PCD layer of this type of abrasive compact will typically contain a catalyst/solvent or binder phase in addition to the diamond particles. This typically takes the form of a metal binder matrix, which is intermingled with the intergrown network of particulate diamond material. The matrix usually comprises a metal exhibiting catalytic or solvating activity towards carbon such as cobalt, nickel, iron or an alloy containing one or more such metals.

PCD composite abrasive compacts are generally produced by forming an unbonded assembly of the diamond particles and solvent/catalyst, sintering or binder aid material on a cemented carbide substrate. This unbonded assembly is then placed in a reaction capsule, which is then placed in the reaction zone of a conventional high pressure/high temperature apparatus. The contents of the reaction capsule are then subjected to suitable conditions of elevated temperature and pressure to enable sintering of the overall structure to occur.

The preferred solvent/catalysts or binder systems used to form PCD materials characterized by diamond-to-diamond bonding, which include transition metal such as Co, Ni, Fe, and also metals such as Mn, are largely due to the high carbon solubility of these elements when molten. This allows some of the diamond material to dissolve and reprecipitate again as diamond, hence forming intercrystalline diamond bonding while in the diamond thermodynamic stability regime (at high temperature and high pressure). This intercrystalline diamond-to-diamond bonding is desirable because of the resulting high strength and wear resistance of the PCD materials.

The unfortunate result of using such solvent/catalysts is a process known in the literature as thermal degradation. This degradation occurs when the diamond composite material is subjected, in the presence of such solvent/catalyst material, to temperatures typically greater than 700° C. either under tool application or tool formation conditions. This temperature can severely limit the application of diamond composite materials generally, and PCD materials particularly in areas such as rock drilling or machining of materials.

Thermal degradation of PCD materials is postulated to occur via two mechanisms:

The first results from differences in the thermal expansion coefficients of the metallic solvent/catalyst binder and the intergrown diamond. Differential expansion at elevated temperature can cause micro-cracking of the intergrown diamond. It may become of particular concern even at temperatures exceeding 400° C.

The second is due to the inherent catalytic activity of the metallic solvent/catalyst in a carbon system. The metallic binder begins converting the diamond to non-diamond carbon when heated above approximately 700° C. This effect occurs appreciably even though the binder is still in the solid state. At low pressures, i.e. in the graphite stability regime, this results in the formation of non-diamond carbon, in particular graphitic carbon, the formation of which will ultimately cause bulk degradation of mechanical properties, leading to catastrophic mechanical failure. This second mechanism applies more generally to diamond composite materials comprising solvent/catalyst material, even where such material is absent significant diamond intergrowth.

Removal of catalyst from the polycrystalline diamond body of PDC compact, for example, by chemical leaching in acids, leaves an interconnected network of pores and a residual catalyst (up to about 10 vol %) trapped inside the polycrystalline diamond body. It has been demonstrated that depletion of cobalt from the polycrystalline diamond body of the PDC compact significantly improves a compact's abrasion resistance. Thus, it is theorized that a thicker cobalt depleted layer near the cutting edge, such as more than about 100 µm provides better abrasion resistance of the PDC compact than a thinner cobalt depleted layer, such as less than about 100 µm. Another known process issue encountered during HPHT synthesis which could not be optimized is the uneven distribution of diamond grains inside the PDC layer after HPHT sintering. This is because that the diamond feeds employed have multiple sizes ranging from nanometers to a few tens micrometers that caused inhomogeneous distribution during feed blending process, resulting in segregation of the diamond feeds. This would cause inconsistent cutting performance if existing in the PDC layer, leading to a premature failure during performance testing.

Even though the top working surface has a leached layer, the underneath adjacent zone is still unleached which will inevitably cause the above mentioned failure as the cutting process continuously progress.

Therefore, there is a need to have thermally stable PDC cutters to improve overall mechanical properties of a PDC including wear resistance and toughness by modifying their constitutions.

SUMMARY

In one embodiment, a superabrasive compact may comprise a substrate; a superabrasive volume attached to the substrate. The superabrasive volume may have a plurality of polycrystalline diamond particles and a non-catalytic binder (NCB). The polycrystalline diamond particles bonded in part by the non-catalytical binder.

In another embodiment, a method of making a superabrasive compact may comprise steps of mixing a non-catalytic binder with a plurality of diamond particles; subjecting the non-catalytic binder and the plurality of diamond particles to first conditions of temperature and pressure suitable for producing an agglomerate granule; mixing the agglomerate granule with a third plurality diamond particles; and positioning the resulting mixture proximate to a substrate, wherein the substrate has hard metal carbides and a binder having carbon at least partially dissolved therein; subjecting the resulting mixture to second conditions of temperature and pressure suitable to produce the polycrystalline diamond compact.

In yet another embodiment, a method of making a superabrasive compact may comprise steps of mixing a first plurality of diamond particles with a second plurality of diamond particles; subjecting the mixture of the plurality of diamond particles to first conditions of temperature and pressure suitable for producing an agglomerate granule; mixing the agglomerate granule with a third plurality diamond particles; and positioning the resulting mixture proximate to a substrate; and subjecting the resulting mixture to conditions of second temperature and pressure suitable to produce the polycrystalline diamond compact.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1A:
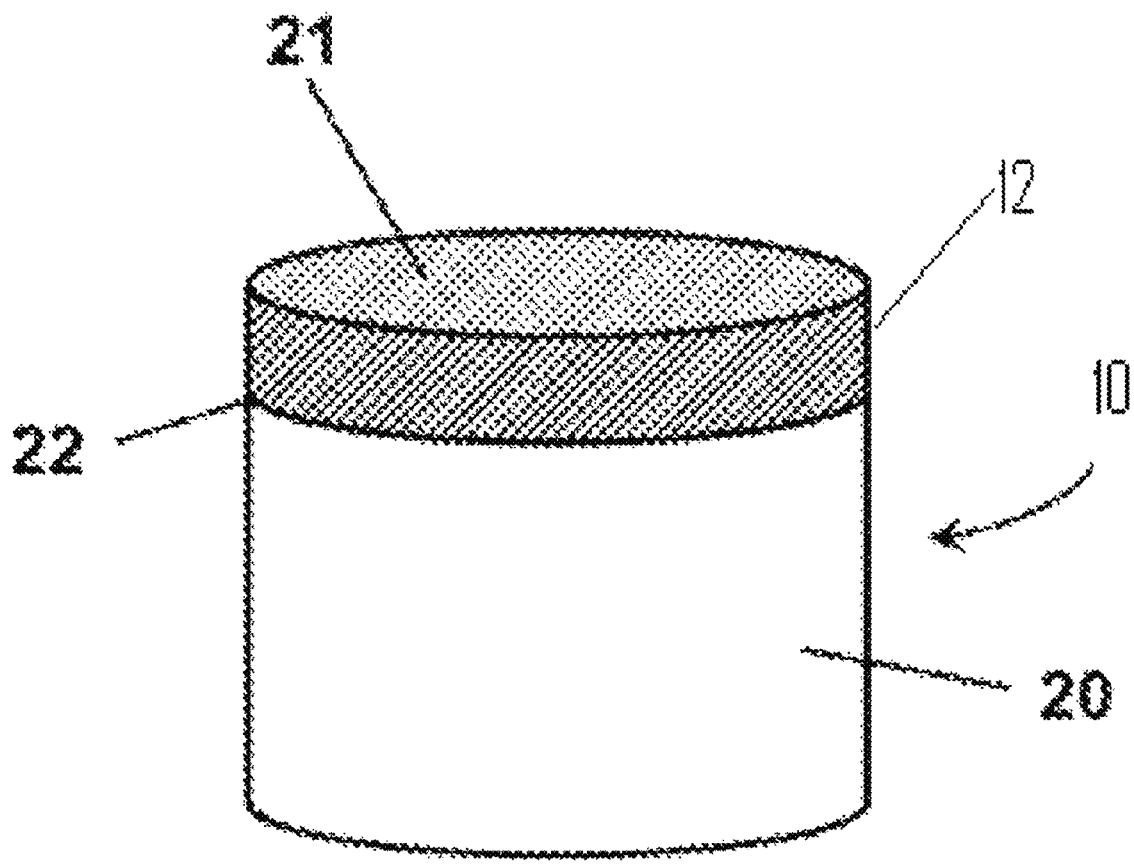
FIG. 1(a) is a schematic perspective view of a cylindrical shape thermally stable polycrystalline diamond compact produced in a high pressure high temperature (HPHT) process according to an embodiment.

Before the description of the embodiment, terminology, methodology, systems, and materials are described; it is to be understood that this disclosure is not limited to the particular terminologies, methodologies, systems, and materials described, as these may vary. It is also to be understood that the terminology used in the description is for the purpose of describing the particular versions of embodiments only, and is not intended to limit the scope of embodiments. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%.

As used herein, the term "superabrasive particles" may refer to ultra-hard particles or superabrasive particles having a Knoop hardness of 3500 KHN or greater. The superabrasive particles may include diamond and cubic boron nitride, for example. The term "abrasive", as used herein, refers to any material used to wear away softer materials.

The term "particle" or "particles", as used herein, refers to a discrete body or bodies. A particle is also considered a crystal or a grain.

The term "superabrasive compact", as used herein, refers to a sintered product made using super abrasive particles, such as diamond feed or cubic boron nitride particles. The compact may include a support, such as a tungsten carbide support, or may not include a support. The "superabrasive compact" is a broad term, which may include cutting element, cutters, or polycrystalline cubic boron nitride insert.

The term "cutting element", as used herein, means and includes any element of an earth-boring tool that is used to cut or otherwise disintegrate formation material when the earth-boring tool is used to form or enlarge a bore in the formation.

The term "non-catalytic binder" material, as used herein, may refer to any material, metallic elements, non-metal, or semi-conductor materials, which do not involve or help tungsten carbide substrate chemical formation.

The term "earth-boring tool", as used herein, means and includes any tool used to remove formation material and form a bore (e.g., a wellbore) through the formation by way of removing the formation material. Earth-boring tools include, for example, rotary drill bits (e.g., fixed-compact or "drag" bits and roller cone or "rock" bits), hybrid bits including both fixed compacts and roller elements, coring bits, percussion bits, bi-center bits, reamers (including expandable reamers and fixed-wing reamers), and other so-called "hole-opening" tools.

The term "feed" or "diamond feed", as used herein, refers to any type of diamond particles, or diamond powder, used as a starting material in further synthesis of PDC compacts.

The term "polycrystalline diamond", as used herein, refers to a plurality of randomly oriented or highly oriented monocrystalline diamond particles, which may represent a body or a particle consisting of a large number of smaller monocrystalline diamond particles of any sizes. Polycrystalline diamond particles usually do not have cleavage planes.

The term "superabrasive", as used herein, refers to an abrasive possessing superior hardness and abrasion resistance. Diamond and cubic boron nitride are examples of superabrasives and have Knoop indentation hardness values of over 3500.

The terms "diamond particle" or "particles" or "diamond powder", which is a plurality of a large number of single crystal or polycrystalline diamond particles, are used synonymously in the instant application and have the same meaning as "particle" defined above.

Polycrystalline diamond compact (or "PCD", as used hereinafter) may represent a volume of crystalline diamond grains with embedded foreign material filling the inter-grain space. In one particular case, a compact comprises crystalline diamond grains, bound to each other by strong diamond-to-diamond bonds and form a rigid polycrystalline diamond body, and the inter-grain regions, disposed between the bounded grains and filled in one part with a catalyst material (e.g. cobalt or its alloys), which was used to promote diamond bonding during fabrication, and other part may be filled with other materials which may remain after the sintering of diamond compact. Suitable metal solvent catalysts may include the iron group transitional metal in Group VIII of the Periodic table.

"Thermally stable polycrystalline diamond" as used herein is understood to refer to intercrystalline bonded diamond that includes a volume or region that is or that has been rendered substantially free of the solvent metal catalyst or binder used to form PCD, or the solvent metal catalyst or binder used to form PCD remains in the region of the diamond body but is otherwise reacted or otherwise rendered ineffective in its ability adversely impact the bonded diamond at elevated temperatures as discussed above.

In another particular case, a polycrystalline diamond composite compact comprises a plurality of crystalline diamond grains, which are not bound to each other, but instead are bound together by foreign bonding materials such as borides, nitrides, carbides, and others, e.g. by silicon carbide bonded diamond material.

Polycrystalline diamond compacts (or PDC compacts) may be fabricated in different ways and the examples discussed herein do not limit a variety of different types of diamond composites and PDC compacts which may be produced according to an embodiment.

In one particular example, polycrystalline compacts may be formed by placing a mixture of diamond powder with a suitable solvent catalyst material (e.g. cobalt powder) on the top of WC—Co substrate, the assembly is then subjected to conditions of HPHT process, where the solvent catalyst promotes desired inter-crystalline diamond-to-diamond bonding resulted in the formation of a rigid polycrystalline diamond body and, also, provides a binding between polycrystalline diamond body and WC—Co substrate.

In another particular example, a polycrystalline diamond compact is formed by placing diamond powder without a catalyst material on the top of substrate containing a catalyst material (e.g. WC—Co substrate). In this example, necessary cobalt catalyst material is supplied from the substrate and melted cobalt is swept through the diamond powder during the HPHT process.

The presence of catalyst materials inside the polycrystalline diamond body may promote the degradation of the cutting edge of the compact during the cutting process, especially if the edge temperature reaches a high enough critical value. It is theorized that the cobalt driven degradation may be caused by the large difference in coefficient of thermal expansion between diamond and catalyst (e.g. cobalt metal), and also by the catalytic effect of cobalt on diamond graphitization. Removal of catalyst from the polycrystalline diamond body of PDC compact, for example, by chemical leaching in acids, leaves an interconnected network of pores and a residual catalyst (up to about 10 vol %) trapped inside the polycrystalline diamond body. It has been demonstrated that depletion of cobalt from the polycrystalline diamond body of the PDC compact significantly improves a compact's abrasion resistance. Thus, it is theorized that a thicker cobalt depleted layer near the cutting edge, such as more than about 100 μm may provide better abrasion resistance of the PDC compact than a thinner cobalt depleted layer, such as less than about 100 μm.

The invention discloses an application of agglomerated diamond granules as a filler in fabrication of PDC cutter. The present embodiment provides a way to reduce catalyst contents remained at the interstitial areas of polycrystalline diamond table during the HPHT synthesis. Moreover, the same idea can also improve the uniformity of diamond feeds blending, resulting in a uniform distribution of multiple sized diamond grains in the PDC layer.

A superabrasive compact 10 in accordance with an embodiment is shown in FIG. 1(a). Superabrasive compact 10 may be inserted into a downhole of a suitable tool, such as a drill bit, for example. One example of the superabrasive compact 10 may include a diamond table 12 having a top surface 21.

In one embodiment, the superabrasive compact 10 may be a standalone compact without a substrate. In another embodiment, the superabrasive compact 10 may include a substrate 20 attached to the superabrasive volume 12 formed by a plurality of polycrystalline diamond particles and a non-catalytic binder. The polycrystalline diamond particles bonded in part by the non-catalytic binder. The non-catalytic binder may include at least one of Titanium, $MgCO_3$, Boron, Tantalum, $CaCO_3$, Chromium Aluminum Carbide ($Cr_2AlC$), or Niobium.

The non-catalytic materials can be a binder 1) to form diamond agglomerate granule at atmosphere during even blending process; 2) to form diamond-diamond bond under high temperature high pressure (HTHP) conditions to create a non-Cobalt multicrystalline granular in the interstitial area; 3) to react with diamond grains and form carbide layers to bond diamond grains together as a non-cobalt multicrystalline granular in the interstitial area.

The substrate 20 may be metal carbide, attached to the superabrasive volume 12 via an interface 22 separating the superabrasive volume 12 and the substrate 20. The interface 22 may have an uneven interface. Substrate 20 may be made from hard metal carbides and a binder having carbon at least partially dissolved therein. In one embodiment, the substrate 20 may be cemented cobalt tungsten carbide, while the superabrasive volume 12 may be formed from a polycrystalline ultra-hard material, such as polycrystalline diamond or diamond crystals bonded by a foreign material. In one embodiment, non-catalytic binder may comprise at least one of Titanium, $MgCO_3$, Boron, Tantalum, $CaCO_3$, $Cr_2AlC$ or Niobium.

Figure 1B:
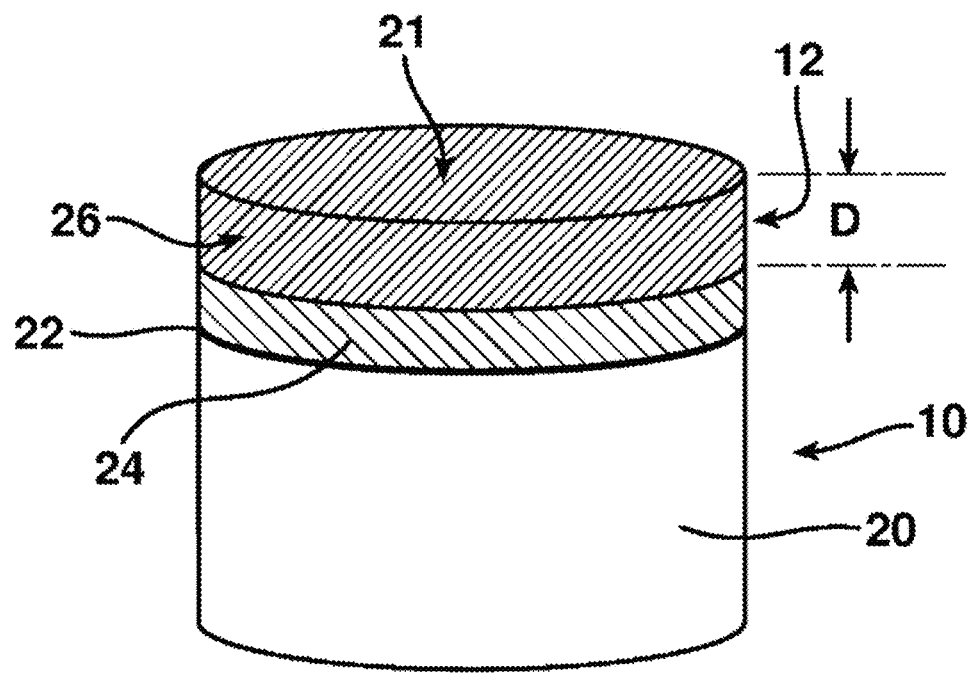
FIG. 1(b) is a schematic perspective view of a cylindrical shape thermally stable polycrystalline diamond compact produced in a high pressure high temperature (HPHT) process according to another embodiment.

Still in FIG. 1(b), the superabrasive volume 12 may include at least two layers with a first layer 26 and a second layer 24. The second layer 24 may be closer to the interface 22 and may be sandwiched between the substrate 20 and the first layer 26.

The superabrasive compact 10 may be referred to as a polycrystalline diamond compact ("PCD") when polycrystalline diamond is used to form the superabrasive volume 12. PCD compacts are known for their toughness and durability, which allow them to be an effective cutter in demanding applications. Although one type of superabrasive compact 10 has been described, other types of superabrasive compacts 10 may be utilized. For example, in one embodiment, superabrasive compact 10 may have a chamfer (not shown) around an outer peripheral of the top surface 21. The chamfer may have a vertical height of about 0.5 mm or 1 mm, for example, and an angle of about 45° degrees, for example, which may provide a particularly strong and fracture resistant tool component. The superabrasive compact 10 may be a subject of procedure depleting catalyst metal (e.g. cobalt) near the cutting surface of the compact, for example, by chemical leaching of cobalt in acidic solutions. The unleached superabrasive compact may be fabricated according to processes known to persons having ordinary skill in the art. Methods for making diamond compacts and composite compacts are more fully described in U.S. Pat. Nos. 3,141,746; 3,745,623; 3,609,818; 3,850, 591; 4,394,170; 4,403,015; 4,794,326; and 4,954,139.

Figure 2:
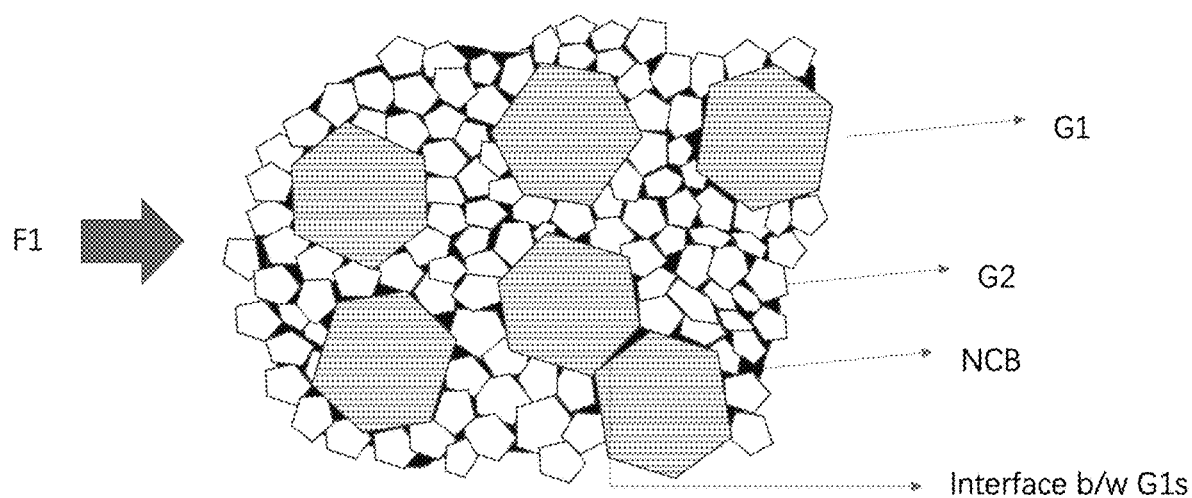
FIG. 2 is a schematic view of an agglomerate granule by mixing two sizes of diamond particles with non-catalytic binder according to one embodiment.

As shown in FIG. 2, an agglomerated diamond granule F1 comprises diamond grains having two different sizes of diamonds G1 and G2 and a non-catalytic binder (NCB). Diamonds G1 include a first plurality of polycrystalline diamond particles with a size ranging from about 1-10 μm, for example. Diamonds G1 may comprise mono- or multi- or nano-crystalline diamonds. Diamonds G2 include a second plurality of polycrystalline diamond particles with a size ranging from about 10 nm to about 5 μm, for example. Diamonds G2 may comprise mono- or multi- or nano-crystalline diamonds. The size of the granule F1 may be in a range of about 3 to about 50 μm, for example. Still in FIG. 2, the interface between diamonds G1 and diamonds G2 contains a binder phase (non-catalytical binders (NCB). Similarly, the interfaces among diamonds G1 and G2 contain a binder phase as well.

Figure 3:
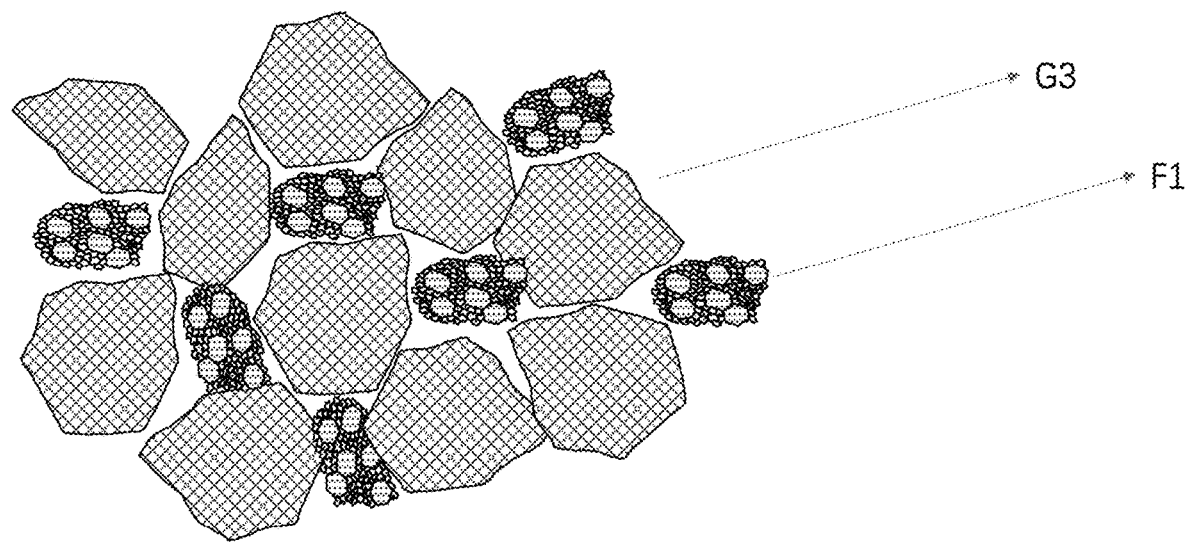
FIG. 3 is a schematic view of a plurality of diamonds mixing with the agglomerate granule according to one embodiment.

Such diamond granule F1 has similar particle size as the main diamond grains G3 as shown in FIG. 3, which constitute the PCD skeleton. Diamonds G3 includes a third plurality of polycrystalline diamond particles with a size ranging from about 10 μm to 100 μm. Diamond particle G3 can be mono, or multi-, or nano-crystalline diamonds, for example. The size ratio between G3 and the F1 is from about 1 to about 100 (preferably 2) The size ratio between diamonds G3 and the granule F1 is from about 1 to about 100, for example. In one embodiment, the size ratio may be preferably about 2, for example.

Figure 4:
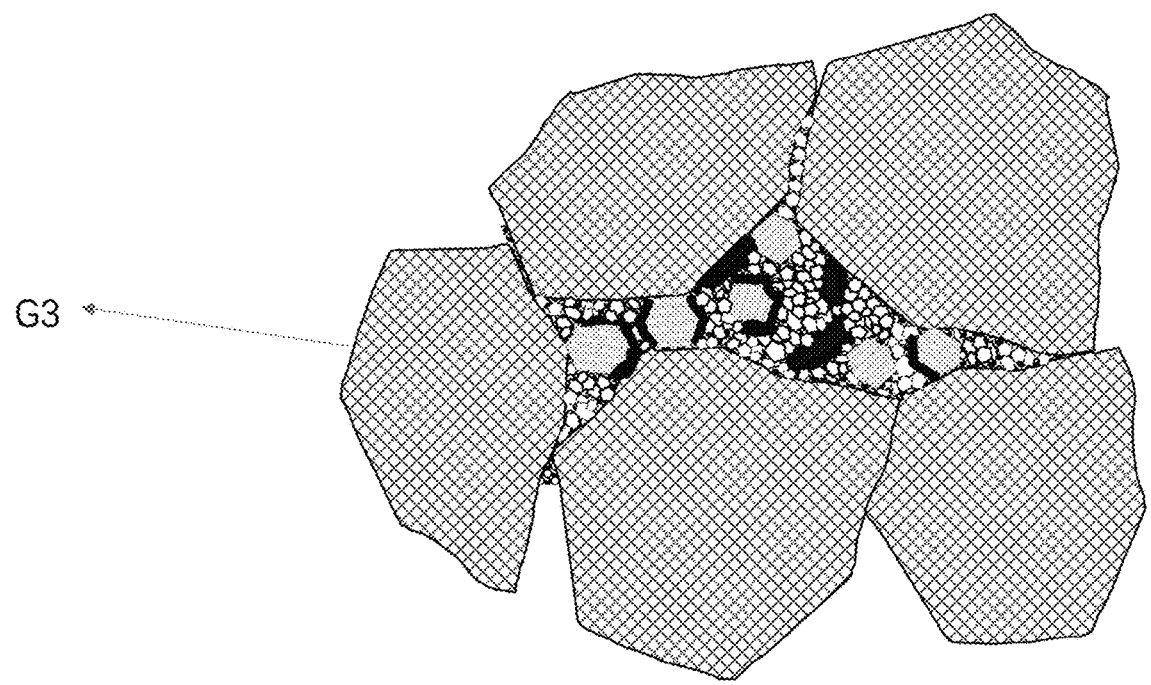
FIG. 4 is a schematic view of a plurality of diamond granules filling into the interstitial region through broken into pieces under high pressure high temperature (HPHT) according to one embodiment.

The diamond granule may have about 16% when mixed with the main diamond grains G3, and about homogeneously distributes into the matrix of the main diamond grains G3 during blending (shown in FIG. 3). When subjected to HPHT sintering process, upon cold pressing, the diamond granules break inter-granularly along the binder phase into small pieces to fill into the interstitial regions among the main diamond grains (shown in FIG. 4).

Under the high pressure and elevated temperature, the non-catalytic binder material become liquidized in the interstitial area and act as a solvent to bind nearby grains together. The bonding between diamond grains can be through diamond to diamond bonding and/or a reacted new phase resulting from a reaction between the non-catalytic binder material and diamond (see FIG. 5). Moreover, the non-catalytic binder material inside the interstitial area can be detached from the diamond grains during the cold pressing and segregated together to form several pools in the interstitial area. These described formations in the interstitial area are formed during HPHT, prior to cobalt sweep from the substrate. So the volume being occupied by the cobalt alloys is highly reduced in the interstitial area of the PCD, which leads to a much less residual cobalt content in the PCD, i.e. <5 vol %. With less content of residual cobalt alloys in the PCD layer, the highly thermally stable PDC cutter with a high abrasion resistance can be achieved in drilling operation.

In certain applications, it may be desired to have a PCD body comprising a single PCD-containing volume or region, while in other applications, it may be desired that a PCD body be constructed having two or more different PCD-containing volume or regions. For example, it may be desired that the PCD body include a first PCD-containing region extending a distance D from the top surface or a working surface, as shown in FIG. 1, and a second PCD-containing region extending from the first PCD-containing region to the substrate. The PCD-containing regions may be formed having different diamond densities and/or be formed from different diamond grain sizes, and/or be formed from leaching the PCD with acid solutions partially or fully. It is, therefore, understood that thermally stable polycrystalline diamond constructions of the invention may include one or multiple PCD regions within the PCD body as called for by a particular drilling or cutting application.

In one embodiment, the superabrasive volume 12 may have about 60 to about 99.5 weight % diamond, about 0.5 to 40 weight % non-catalytical binder.

The superabrasive volume 12 may be partially leached according to known methods. The selected region of the PCD body may be rendered thermally stable by removing substantially all of the catalyst material therefrom by exposing the desired surface or surfaces to acid leaching, as disclosed for example in U.S. Pat. No. 4,224,380. Generally, after the PCD body or compact is made by HPHT process, the identified surface or surfaces, e.g., at least a portion of the working or cutting surfaces, are placed into contact with the acid leaching agent for a sufficient period of time to produce the desired leaching catalyst material depletion depth.

Suitable leaching agents for treating the selected region to be rendered thermally stable include materials selected from the group consisting of inorganic acids, organic acids, mixtures and derivatives thereof. The particular leaching agent that is selected may depend upon such factors as the type of catalyst material used, and the type of other non-diamond metallic materials that may be present in the PCD body, e.g., when the PCD body is formed using synthetic diamond powder. While removing the catalyst material from the selected region operates to improve the thermal stability of the selected region, it is known that PCD bodies especially formed from synthetic diamond powder may include, in addition to the binder material, such as a metal selected from the group consisting of Co, Ni, Fe, and combinations thereof, or non-binder materials, such as other metallic elements that can also contribute to thermal instability.

Graphitization may be reduced or eliminated in PCD materials if the binder material in PCD materials may, after sintering, be replaced with a non-catalytic material such as Titanium, $MgCO_3$, Boron, Tantalum, or Niobium, for example. Similarly, micro-cracking may be reduced by lessening the mismatch between the expansion coefficient of the diamond phase and the binder material. Both of these goals may be accomplished by displacing the binder material with a different material or by substituting the material used as the binder material with a material having better physical properties. The PCD so formed is typically bonded to a substrate either in the same process or in a subsequent process to form a superabrasive compact. The present embodiment describes a superabrasive compact wherein the PCD is bonded to a substrate containing a binder material that melts and sweeps at low temperatures.

Figure 6:
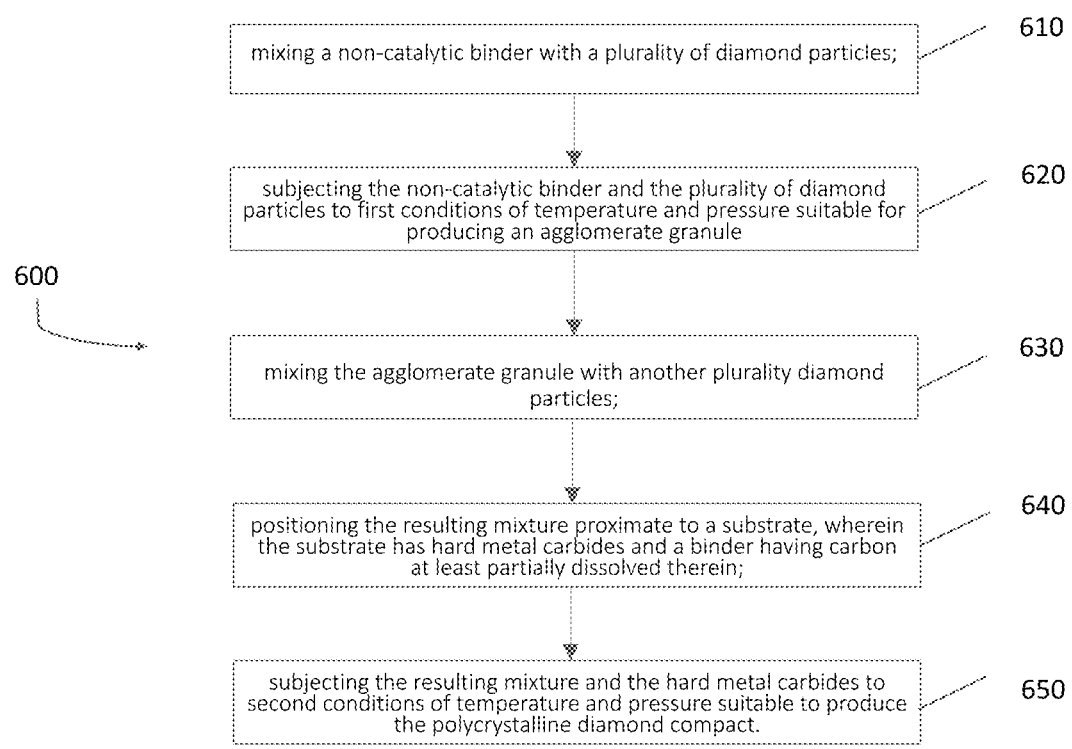
FIG. 6 is a flow chart showing a method of making a superabrasive compact according to one embodiment.

According to a method 600 of making a superabrasive compact, described as shown in FIG. 6, may comprise steps of mixing a non-catalytic binder with a plurality of diamond particles at step 610; steps of subjecting the non-catalytic binder and the plurality of diamond particles to first conditions of temperature and pressure suitable for producing an agglomerate granule at step 620; step of mixing the agglomerate granule with another plurality diamond particles at step 630; step of positioning the resulting mixture proximate to a substrate, wherein the substrate has hard metal carbides and a binder having carbon at least partially dissolved therein at step 640; step of subjecting the resulting mixture and the hard metal carbides to second conditions of temperature and pressure suitable to produce the superabrasive compact at step 650.

A polycrystalline diamond after high temperature high pressure may comprise main diamond grains G3, diamond G2 small grains, non-catalytic binders, and cobalt. The main diamond grains G3 are bonded together through cobalt sweep from WC—Co substrate. Interstitial areas among G3 diamond grains may include generally with G1 diamond grains of monocrystalline diamond or nano crystalline diamond or both.

Figure 5:
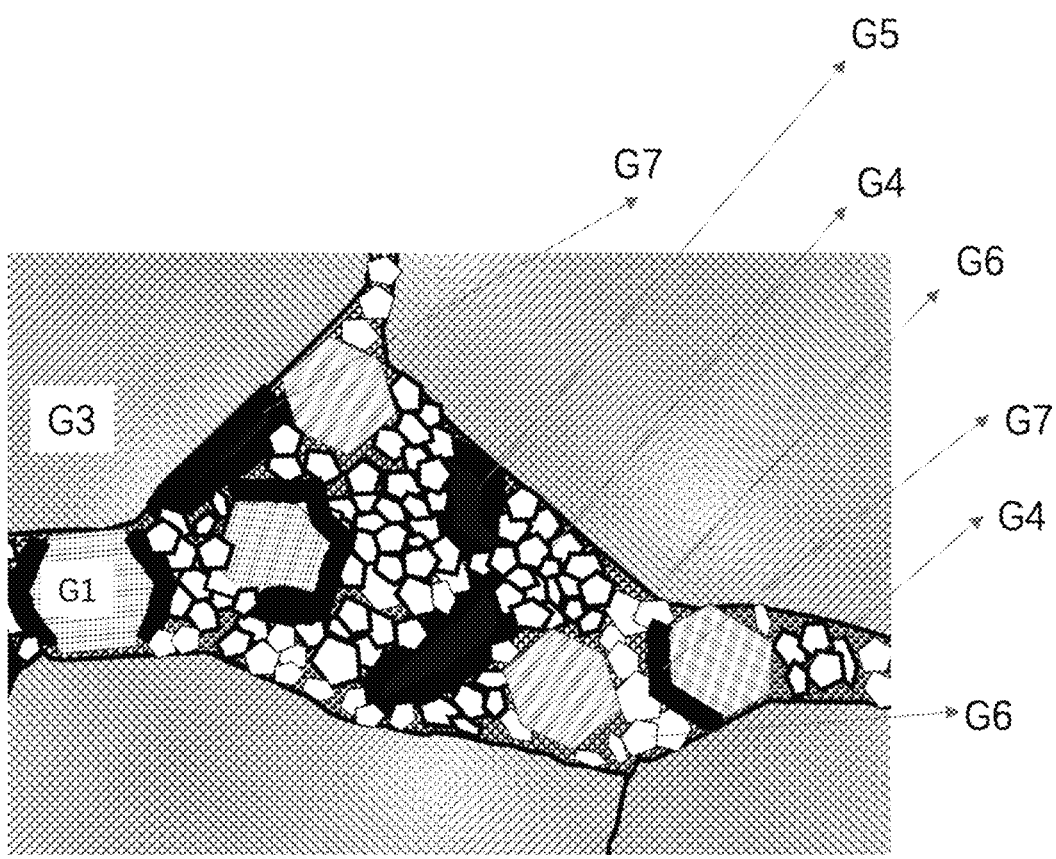
FIG. 5 is an enlarged schematic view of microstructures of the interstitial area shown in FIG. 4.

In one embodiment, after high temperature high pressure, non-catalytic binder (NCB) may be segregated to form pools G5, as shown in FIG. 5. In one embodiment, the non-catalytic binder is about 1% to about 5% of diamond particles, for example. A remaining diamonds G2 from the agglomerate portion from F1 granule was further sintered with NCB or swept cobalt under high temperature high pressure (HPHT) to form a multicrystalline diamond particle G4. The grain-boundary among diamonds G2 grains inside the diamonds G4 particle may be NCB and diamond-diamond bonding. Some of diamond G2 grains may be segregated under HPHT and sintered together with Co binder (G6). On the surface of G6, there exists no NCB, for example. In some embodiments, NCB pools can be dispersed and adhered to the diamond G1 and/or G3 diamond, labelled as G7.

The thermally stable PCD may be made in several ways. For example, the PCD may be made from a thermally stable binder such as metal carbonate in a high pressure high temperature cycle. Alternatively, a catalyst/binder-sintered PCD may be at least partially leached in a subsequent step to remove the catalyst or binder material from the interstitial channels. The partially leached disc may be at least partially infiltrated with a non-binder material.

Figure 7:
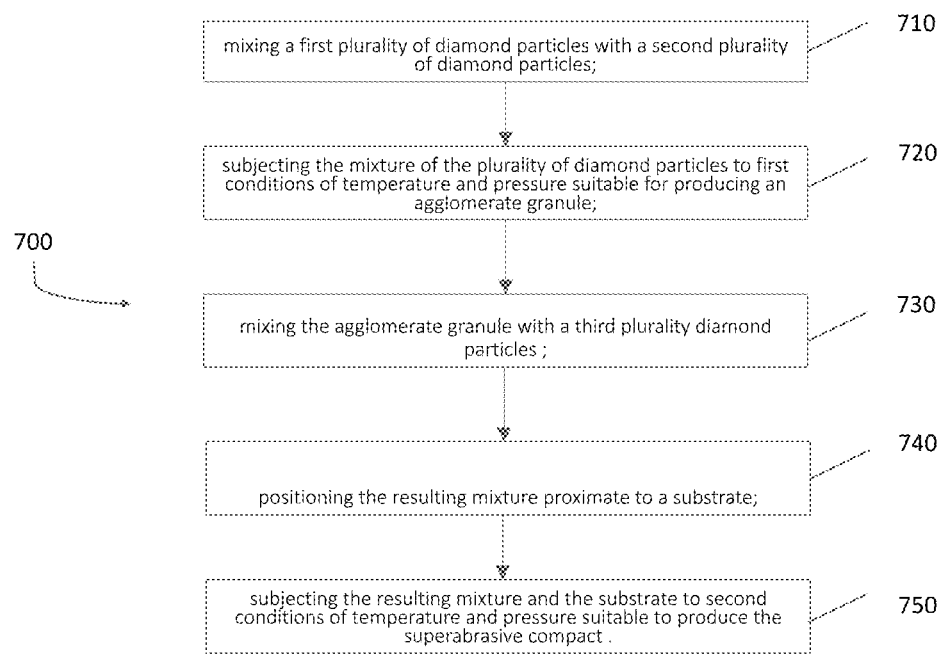
FIG. 7 is a flow chart showing a method of making a superabrasive compact according to another embodiment.

In another embodiment, as shown in FIG. 7, a method 700 of making a superabrasive compact may comprise steps of mixing a first plurality of diamond particles with a second plurality of diamond particles in a step 710; subjecting the mixture of the plurality of diamond particles to first conditions of temperature and pressure suitable for producing an agglomerate granule in a step 720; mixing the agglomerate granule with a third plurality diamond particles in a step 730; positioning the resulting mixture proximate to a substrate in a step 740; and subjecting the resulting mixture and the substrate to second conditions of temperature and pressure suitable to produce the superabrasive compact in a step 750.

The step 710 of mixing a first plurality of diamond particles with a second plurality of diamond particles may further comprise mixing with non-catalytic binders.

Optionally in any step, first plurality of polycrystalline diamond particles may have a size ranging from about 1 μm to about 10 μm, for example. Optionally in any step, the second plurality of polycrystalline diamond particles with a size ranging from about 10 nm to 5 μm. In one embodiment, the third plurality of polycrystalline diamond particles with a size ranging from about 10 μm to about 100 μm. In another embodiment, a size ratio between the third plurality polycrystalline diamond and the agglomerate granule may be from about 1 to about 100, for example. In further embodiment, a size ratio between the third plurality polycrystalline diamond and the agglomerate granule may be about 2, for example.

By the time when the temperature reaches about 1200° C., the catalyst material, such as an iron group transitional metal, e.g., cobalt, nickel, or iron, and combinations thereof, from the cemented carbide substrate may sweep into the interstitial channels of the diamonds.

A sintered tungsten carbide with about 12 wt % cobalt and stoichiometric carbon to tungsten ratio is expected to have a catalyst melting point of 1348° C.

Example 1

PDC cutters are produced by the methods described in the prior art, composed of a starting diamond powder with a grain size of from about 1-10 microns in diameter with diamond powder of a grain size of from about 10 nm to about 5 microns in diameter and a metal carbide, such as tungsten carbide, attached to the polycrystalline diamond via an interface between the polycrystalline diamond and tungsten carbide. Two sizes of diamond powder are mixed with non-catalytic binder, such as boron, to form agglomerated diamond granules. The diamond granules are mixed with main diamond powder, with a size of ranging from about 10 μm to 100 μm. The mixture is subjected cold press at room temperature.

The Ta cup is loaded by a volume of diamond feed, followed by inserting a WC substrate (OD 0.711"). The WC substrate is pre-sintered with cobalt. The assembled Ta cup was further encapsulated with salt and graphite sleeves as well as some graphite pills. The Ta cup is fit inside the sleeves tightly. The encapsulated assembly is transferred into cell loading area, and the entire body is loaded into the cell specifically designed for cubic press. The cell is then loaded into the space formed by the cubic press anvils and is applied high pressure and high temperature (HPHT) cycle to the cell for 30 minutes. The soak pressure is maintained around 6.0 GPa and the soak temperature was about 1550° C. The soak time for bonding of the thermally stable disc to the carbide was about 10 minutes. After the bonding cycle, the cup is taken out of the pressed cell for further post processing.

The cutter is ground and finished to 16 mm in diameter, and 13.2 mm in height. A 45 degree bevel is placed on the edge of the diamond, with a thickness of about 0.4 mm. Some cutters are fully leached by removing the catalyst from the diamond table.

While reference has been made to specific embodiments, it is apparent that other embodiments and variations can be devised by others skilled in the art without departing from their spirit and scope. The appended claims are intended to be construed to include all such embodiments and equivalent variations.

We claim:

1. A method of making a superabrasive compact, comprising:
    mixing a non-catalytic binder with a plurality of diamond particles, wherein the non-catalytic binder is at least one of Titanium, MqCO$_3$, CaCO$_3$, Boron, Tantalum, Cr$_2$AlC, or Niobium;
    subjecting the non-catalytic binder and the plurality of diamond particles to first conditions of temperature and pressure suitable for producing an agglomerate granule;
    mixing the agglomerate granule with a third plurality diamond particles; and
    positioning the resulting mixture proximate to a substrate, wherein the substrate has hard metal carbides and a binder having carbon at least partially dissolved therein;
    subjecting the resulting mixture and the hard metal carbides to second conditions of temperature and pressure suitable to produce the superabrasive compact.

2. The method of claim 1, wherein the plurality of diamond particles comprise a first plurality of diamond particles with a size ranging from about 1 to about 10 μm.

3. The method of claim 2, wherein the plurality of diamond particles comprise a second plurality of diamond particles with a size ranging from about 10 nm to about 5 μm.

4. The method of claim 3, wherein the other plurality of diamond particles comprise a third plurality of diamond particles with a size ranging from about 10 μm to about 100 μm.

5. The method of claim 4, wherein the agglomerate granule has a size of about 3-50 μm.

6. The method of claim 5, wherein a size ratio between the third plurality diamond particles and the agglomerate granule is from about 1 to about 100.

7. The method of claim 6, wherein the first conditions of temperature and pressure suitable for producing an agglomerate granule are less than 250° C.

8. The method of claim 5, wherein under the second conditions of temperature and pressure, the agglomerate granule breaks inter-granularly along the binder phase into small pieces to fill into interstitial regions among the third plurality of diamond particles.

9. A method of making a superabrasive compact, comprising:
    mixing a first plurality of diamond particles with a second plurality of diamond particles;
    subjecting the mixture of the plurality of diamond particles to first conditions of temperature and pressure suitable for producing an agglomerate granule;
    mixing the agglomerate granule with a third plurality diamond particles;
    positioning the resulting mixture proximate to a substrate, wherein the substrate is a pre-sintered cemented carbide substrate; and
    subjecting the resulting mixture and the substrate to second conditions of temperature and pressure suitable to produce the superabrasive compact.

10. The method of claim 9, wherein the step of mixing a first plurality of diamond particles with a second plurality of diamond particles further comprises mixing with non-catalytic binders.

11. The method of claim 9, wherein the first plurality of diamond particles with a size ranging from about 1 to about 10 μm, wherein the second plurality of diamond particles with a size ranging from about 10 nm to about 5 μm.

12. The method of claim 9, wherein the third plurality of diamond particles with a size ranging from about 10 μm to about 100 μm.

13. The method of claim 9, wherein first conditions of temperature and pressure suitable for producing an agglomerate granule are less than 250° C., wherein under second conditions of temperature and pressure, the agglomerate granule breaks inter-granularly along the binder phase into small pieces to fill into interstitial regions among the third plurality of diamond particles.

14. The method of the claim 9, wherein a size ratio between the third plurality diamond particles and the agglomerate granule is from about 1 to about 100.

* * * * *